(12) United States Patent
Sonnenmoser et al.

(10) Patent No.: US 11,919,746 B2
(45) Date of Patent: Mar. 5, 2024

(54) PASSENGER TRANSPORT SYSTEM HAVING CENTRAL CONTROL UNIT AND MULTIPLE FIELD DEVICES HAVING AN OPTIMIZED FAILURE DETECTION METHOD

(71) Applicant: Inventio AG, Hergiswil (CH)

(72) Inventors: Astrid Sonnenmoser, Hochdorf (CH); Ivo Lustenberger, Buttisholz (CH); Thomas Hartmann, Kleinwangen (CH); Adrian Knecht, Döttingen (CH); Kurt Heinz, Buchs (CH)

(73) Assignee: INVENTIO AG, Hergiswil NW (CH)

( * ) Notice: Subject to any disclaimer, the term of this patent is extended or adjusted under 35 U.S.C. 154(b) by 1522 days.

(21) Appl. No.: 16/094,498

(22) PCT Filed: May 3, 2017

(86) PCT No.: PCT/EP2017/060530
§ 371 (c)(1),
(2) Date: Oct. 18, 2018

(87) PCT Pub. No.: WO2017/191186
PCT Pub. Date: Nov. 9, 2017

(65) Prior Publication Data
US 2019/0119068 A1    Apr. 25, 2019

(30) Foreign Application Priority Data
May 4, 2016   (EP) .................................... 16168217

(51) Int. Cl.
*B66B 5/00*   (2006.01)
*B66B 1/34*   (2006.01)
(Continued)

(52) U.S. Cl.
CPC .......... *B66B 5/0031* (2013.01); *B66B 1/3453* (2013.01); *B66B 5/0018* (2013.01); *B66B 13/22* (2013.01); *G06F 13/4282* (2013.01)

(58) Field of Classification Search
CPC ... B66B 5/0031; B66B 1/3453; B66B 5/0018; B66B 13/22; G06F 13/4282
See application file for complete search history.

(56) References Cited

U.S. PATENT DOCUMENTS 6,267,219 B1   7/2001   Spannhake et al.
6,467,585 B1  10/2002   Gozzo et al.
(Continued)

FOREIGN PATENT DOCUMENTS

| CN | 1446175 A | 10/2003 |
|---|---|---|
| CN | 1919712 A | 2/2007 |
| EP | 2251293 A1 | 11/2010 |

*Primary Examiner* — Jeffrey Donels
(74) *Attorney, Agent, or Firm* — William J. Clemens; Shumaker, Loop & Kendrick, LLP

(57) ABSTRACT

A passenger transport system includes a bus system transferring data between a central control unit and a plurality of field devices. In a failure detection method, the field devices are configured in an unbranched chain configuration and the control unit transmits a test telegram to a first field device to start a monitoring cycle during which each field device receiving the test telegram forwards the test telegram to a next field device in the chain. During the monitoring cycle, the control unit monitors a communication between the field devices occurring via the bus system, in order to detect when a field device does not forward the test telegram. A data volume transmitted via the bus system during the failure detection method is significantly reduced in comparison to conventional failure tests such that failures can be recognized more quickly and/or simpler hardware and/or software can be used.

14 Claims, 2 Drawing Sheets

(51) Int. Cl.
B66B 13/22 (2006.01)
G06F 13/42 (2006.01)

(56) References Cited

U.S. PATENT DOCUMENTS

| | | |
|---|---|---|
| 2003/0111300 A1 | 6/2003 | Schuster |
| 2005/0098390 A1 | 5/2005 | Angst |
| 2011/0272218 A1* | 11/2011 | Sonnenmoser ......... B66B 13/22 |
| | | 187/316 |
| 2016/0221793 A1* | 8/2016 | De Coi ................. B66B 5/0031 |
| 2016/0280509 A1* | 9/2016 | Sonnenmoser ......... B66B 13/22 |
| 2017/0334678 A1* | 11/2017 | Sonnenmoser ....... B66B 5/0031 |
| 2017/0341905 A1* | 11/2017 | Sonnenmoser ....... B66B 5/0031 |
| 2017/0349404 A1* | 12/2017 | Sonnenmoser ....... B66B 5/0031 |
| 2018/0354748 A1* | 12/2018 | Lustenberger ........ B66B 25/006 |
| 2019/0119067 A1* | 4/2019 | Sonnenmoser ....... H04L 12/423 |

\* cited by examiner

5 ELEVATOR CAR
7 COUNTERWEIGHT
11 DRIVE MOTOR
13 CENTRAL CONTROL UNIT
17 FIELD DEVICES
19 DOOR SWITCH
23 SWITCH
31 SAFETY MONITORING UNIT

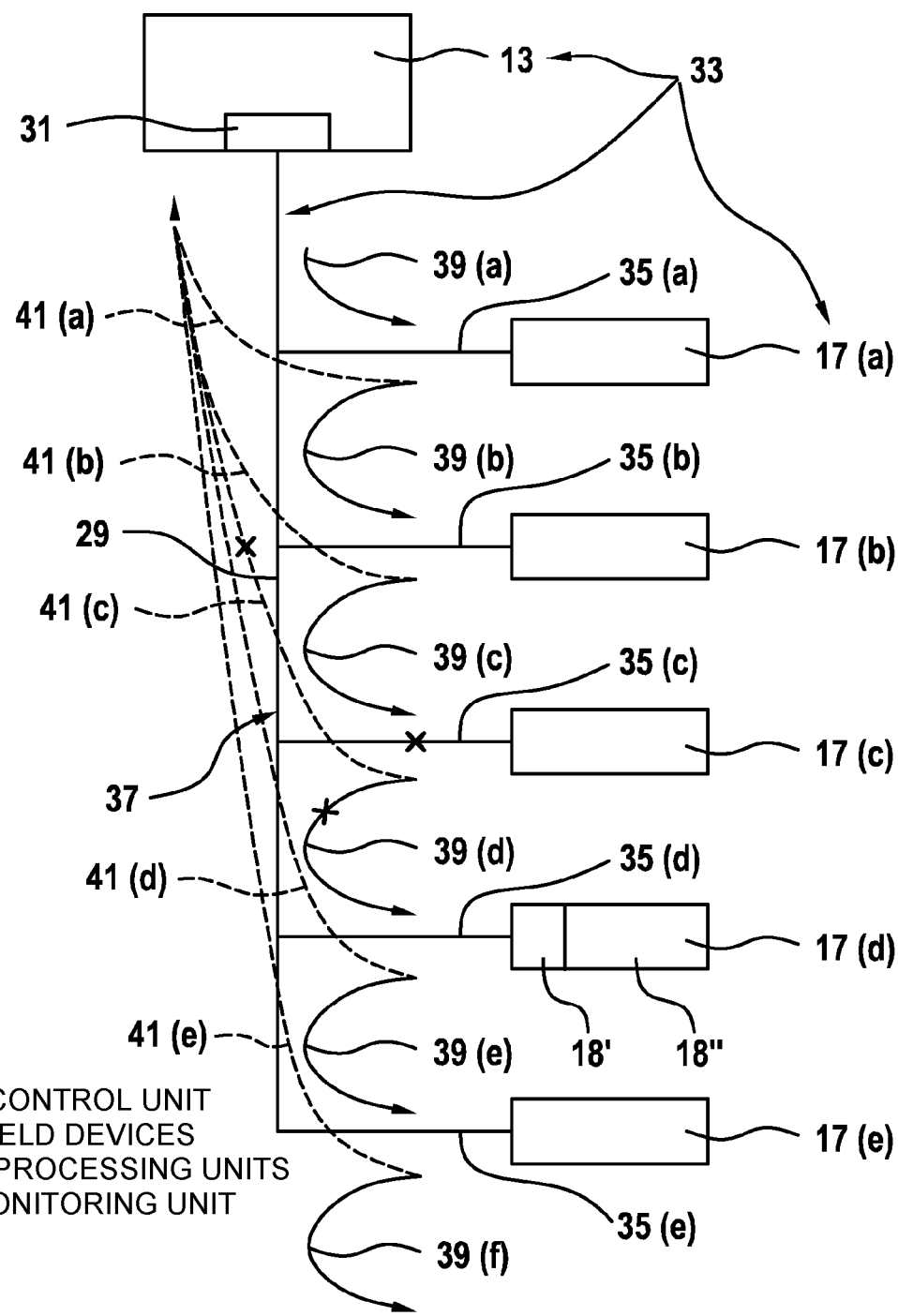

PASSENGER TRANSPORT SYSTEM HAVING CENTRAL CONTROL UNIT AND MULTIPLE FIELD DEVICES HAVING AN OPTIMIZED FAILURE DETECTION METHOD

FIELD

The present invention relates to a passenger transport system, such as an elevator system, in which a plurality of field devices, such as door switches, safety switches, or the like, which communicate with a central control unit, are provided.

BACKGROUND

Passenger transport systems are often used to convey passengers or objects in buildings or structures. A passenger transport system may be an elevator system, for example. Alternatively, a passenger transport system may be an escalator or moving walkway.

Possible designs of passenger transport systems or of embodiments of the invention are explained in the following, mostly using the example of elevator systems. However, embodiments of the invention can also be implemented analogously on passenger transport systems in the form of moving walkways, escalators or the like.

Elevator systems are generally used to be able to convey passengers between different floors inside a structure, for example. For this purpose, in general an elevator car can be moved inside a usually vertical elevator shaft. When the elevator car has reached a desired floor, an elevator door, and optionally together therewith an associated floor door, can be opened in order to allow passengers to access the elevator car and/or to leave the elevator car.

Functions of the elevator system, such as actuation of the drive thereof that moves the elevator car, are usually controlled by a central control unit. The central control unit can also in particular control functions of the elevator system that are relevant to safety. For this purpose, a safety monitoring unit may be provided as part of the control unit or in communication with the control unit. In this case, the central control unit can, for example, take into account information that it can obtain by processing sensor signals or sensor data. The functions of the elevator system can also be controlled by more than one control unit, for example by one control unit that inter alia actuates the drive, and a further control unit that monitors the safety functions. In the following, a central control signal is to be understood to mean every control unit that processes sensor signals and/or generates sensor signals. The sensor signals or sensor data may in particular originate from devices such as door switches or other safety switches that are distributed in the structure accommodating the elevator system and detect or measure locally prevailing conditions or states, for example. Devices of this kind are referred to as field devices in the following.

Furthermore, the control unit itself may generate control signals and transfer said signals to other devices distributed inside the structure, which devices comprise actuators that implement the control signals, for example. The actuators can influence locally prevailing conditions or states in a targeted manner. Alternatively, actuators may also output information, e.g. optically or acoustically, for example. Devices comprising actuators will also be referred to as field devices in the following.

In modern elevator systems, data or signals are transferred between the field devices and the central control unit usually via in particular serial bus systems, which are sometimes also referred to as "field bus systems" or "field buses" for short. In particular in very large elevator systems, for example in high buildings, this can simplify cabling between the field devices and the central control unit and/or keep data transfer times short.

EP 2 251 293 A1 describes a conventional elevator control device comprising a field bus interface.

U.S. Pat. No. 6,467,585 B1 and US 2003/111300 A1 describe elevator control devices comprising a central control unit and a plurality of field devices. The field devices can be received in a logically linked manner as in an unbranched chain configuration. The central control unit transmits a test telegram to a first field device in the chain configuration via the bus system at the start of a monitoring cycle. During the monitoring cycle, in response to the relevant field device receiving a test telegram, each field device forwards the test telegram to a next field device in the chain configuration via the bus system, until the test telegram reaches a final field device in the chain configuration, which device forwards the test telegram to the central control unit. The central control unit tests whether the time between transmitting and receiving the test telegram meets definable conditions.

There may be a need for a passenger transport system in which correct functioning of field devices can be monitored quickly, reliably and/or by means of simple, cost-effective hardware. There may also be a need for a method for efficiently detecting failures in field devices of a passenger transport system. Furthermore, there may be a need for a computer program product that instructs a computer to carry out a method of this kind, as well as for a computer-readable medium on which a computer program product of this kind is stored.

SUMMARY

According to a first aspect of the present invention, a passenger transport system is proposed that comprises a central control unit, a plurality of field devices, and a bus system. The control unit is designed to control functions of the passenger transport system. The field devices are spatially distributed inside the passenger transport system. The bus system is designed to transfer data between the central control unit and the field devices. In this case, each field device is configured to output data to the central control unit and/or another field device via the bus system. Alternatively or additionally, the central control unit is configured to output data to at least one of the field devices via the bus system. The passenger transport system is configured to carry out a specific failure detection method. In this failure detection method, the field devices are received in a logically linked manner as in an unbranched chain configuration. The central control unit transmits a test telegram to a first field device in the chain configuration via the bus system at the start of a monitoring cycle. During the monitoring cycle, in response to the relevant field device receiving a test telegram, each field device then forwards the test telegram to a next field device in the chain configuration via the bus system, until the test telegram reaches a final field device in the chain configuration. During the monitoring cycle, the control unit monitors a communication between the field devices occurring via the bus system, in order to detect when a field device does not forward the test telegram.

Possible advantages and features of embodiments of the invention may be considered, inter alia and without limiting the invention, to be based on the findings and ideas described below.

Operation and/or functions of passenger transport systems are usually controlled by means of a central control unit. In modern passenger transport systems, a current state of the passenger transport system and its components are taken into account in this case. For this purpose, many field devices are spatially distributed over the passenger transport system, using which devices the current state of the passenger transport system and its components can be identified by means of suitably designed sensors and/or can be influenced optionally by means of suitable actuators.

For example, in the passenger transport system, field devices may be configured to output sensor data generated by a sensor to the central control unit via the bus system. In this case, the sensor may be part of the field device. Alternatively, the sensor may be connected only with the field device, such that the field device functions as a kind of data transfer node for the sensor. In this case, sensors may be designed to detect various physical values, in order to be able to permanently or periodically monitor parameters that are relevant to the safety of the passenger transport system, for example.

Alternatively, field devices may comprise one or more actuators, in order to be able to implement specific actions inside the passenger transport system or to be able to influence these actions in a suitable manner. In this case, the central control unit may be configured to output control data to be implemented by an actuator to one of the field devices via the bus system. The actuator may, in turn, be part of the field device or merely connected to the field device.

In modern passenger transport systems, an in particular serial bus system may be provided in this case, which bus system connects the central control unit to each field device and allows data transfer between these components. By using a bus system of this kind, it is no longer necessary to wire each field device separately to the central control unit, as is conventional. Instead, a plurality of field devices can communicate with the control unit, and optionally with one another, via shared data lines. In this case, data transfer is generally regulated by a data transfer protocol that is to be observed by all the participants in the data communication. In a bus system of this kind, each bus participant, i.e. the central control unit and all the field devices in this case, can receive each data telegram transmitted to the bus system. A transmitted data telegram contains an object identifier, for example. This object identifier identifies the contents of the data telegram and not the transmitting or (at least not directly) receiving field device. Each field device knows which data telegrams are relevant to it and analyzes the data telegrams by means of the corresponding object identifiers. This can lead to a data telegram being analyzed by one or more field devices. This may also result in a field device receiving and analyzing only exactly one or even more data telegrams. The central control unit reads and analyzes all the data telegrams.

As the central control unit may in particular be designed to control functions of the passenger transport system that are relevant to safety and must therefore be able to reliably access data or signals from the field devices, it may be necessary for the central control unit to monitor, permanently or at short intervals of time, correct functionality of the field devices and the data transfer to be carried out by the field devices via the bus system. For example, an essential aspect for reliably monitoring a passenger transport system may be that a fault in an individual field device can be detected very quickly.

For example, in an elevator system, it may be necessary to very quickly detect when there is a fault in a field device designed as a door switch that is intended to monitor a closure state of an elevator door or floor door inside the elevator system. A fault of this kind in an individual field device may be caused by a failure in the field device itself. However, the data transfer between the field device and the central control unit via the bus system may be disrupted locally, in particularly interrupted locally. There may be an increased risk of this in particular in large passenger transport systems, in which individual field devices are each connected to central regions of the bus system via a stub line and in which, for example, this stub line can be physically interrupted.

In conventional passenger transport systems, a functionality of field devices and the data transfer established via the bus system is usually monitored by the central control unit requesting, at regular time intervals, each individual field device via the bus system individually by means of a request telegram and the requested field device thereupon sending a response telegram back to the central control unit. In a failure detection method of this kind, for each field device, a request telegram must therefore be transmitted in each case to the field device via the bus system and a response telegram must be transmitted from the field device back to the central control unit via the bus system.

In particular in large passenger transport systems comprising many field devices, in a conventional failure detection method of this kind a significant volume of data to be transferred via the bus system can be produced for each monitoring process. In general, a number of data telegrams corresponding to twice the number of field devices has to be transmitted via the bus system.

From a specific number of field devices available in the passenger transport system, this can lead to a required failure detection time being exceeded when monitoring the field devices. A failure detection time of this kind is specified by regulators, for example, which require that failures in individual field devices, for example, which are essential in particular for the safety of the passenger transport system, can be detected very quickly, i.e. within a short space of time.

In the case of a passenger transport system of this kind provided with many field devices, in order to nevertheless be able to carry out a failure detection method quickly enough to observe required failure detection times, a data transfer rate within the bus system, for example, must conventionally be increased. However, this usually requires increased device-related outlay both in the bus system and in the field devices and the control unit.

For embodiments of the passenger transport system proposed herein, it is proposed to design the passenger transport system to be able to carry out a modified failure detection method. This modified failure detection method makes it possible, inter alia, to significantly reduce a data transfer volume when the plurality of field devices is monitored. This reduces the device-related requirements for the bus system and for the central control unit and the field devices, although required failure detection times are still observed.

For the modified failure detection method, it is first assumed that the field devices of the passenger transport system are logically linked in an unbranched chain configuration. Logical linking in this way of field devices can be carried out irrespective of an actual wiring or electrical connection between the field devices. In fact, the field devices are interconnected via the bus system such that, in principle, each field device can exchange data with every other field device. However, it should be assumed, at least in the context of the failure detection method, that the field devices are logically linked in a kind of unbranched chain, such that each field device has at most one preceding field device from which it receives data, and at most one subsequent field device to which it can forward data. Except for the first and last field devices in the chain configuration, each field device has precisely one preceding and precisely one subsequent field device in this case. In the context of the failure detection method, each field device should, similarly to a "daisy chain", therefore obtain data only from the preceding field device in each case and forward data only to the subsequent field device in each case. Exceptions to this are the first field device in the chain configuration, as this device does not have a preceding field device, and the last field device in the chain configuration, as this device does not have a subsequent field device. Each field device of the chain configuration must be uniquely identifiable in this case, for example by means of an identification number (ID) associated uniquely therewith.

The chain configuration may optionally be closed in an annular manner. For example, the last field device of the chain configuration may be logically connected to the first field device of the chain configuration. A data telegram to be forwarded by the last field device would then be transmitted to the first field device. Alternatively, the last field device of the chain configuration may be logically connected to the central control unit. A data telegram to be forwarded by the last field device would then be transmitted to the control unit.

In order to carry out the failure detection method, the control unit transmits a test telegram to the first field device in the chain configuration via the bus system at the start of the monitoring cycle. During the monitoring cycle, each field device is designed, if it receives a test telegram of this kind, to forward this test telegram to the subsequent field device in the chain configuration in each case via the bus system. After the first field device has received the test telegram from the control unit at the start of the monitoring cycle, said field device forwards the test telegram to the second field device, the second field device forwards the test telegram to the third field device, etc. This forwarding process is continued until the test telegram has passed through the entire chain configuration and reached the last field device. As this last field device usually does not have a subsequent field device, the forwarding of the test telegram generally ends here.

During the monitoring cycle, i.e. while the test telegram is forwarded from field device to field device, the control unit monitors a data communication between the field devices occurring via the bus system. In this way, the control unit can detect when one of the field devices does not forward the test telegram obtained thereby and therefore the chain of forwarding of the test telegram is locally interrupted. The control unit can regard this as an indication that there is a failure in the relevant field device, which is caused, by example, by a technical defect of the field device itself or by a defect in the connection of the field device to the bus system.

In contrast to the above-described conventional failure detection method, in the failure detection proposed herein the control unit does not send a response telegram to each individual field device and then wait for a returning response telegram. Instead, the control unit transmits, only once, a kind of request telegram in the form of a test telegram to the first field device received in the logically linked chain configuration. From there, the test telegram is forwarded to each subsequent field device in the chain configuration in a sequential manner, and a data communication relating thereto from the central control unit via the bus system is monitored. Overall, the number of transmissions of test telegrams can therefore be generally reduced to the number of available field devices. In comparison with the conventional failure detection method, the data transfer volume can hereby be substantially halved. In other words, in the failure detection method proposed herein, only one short test telegram per field device loads the bus system, whereas in the conventional failure detection method described, this was two test telegrams in each case.

Due to the decreased necessary data transfer volume in the failure detection method, a data transfer rate within the passenger transport system can be kept relatively lower despite the required failure detection times to be observed, which leads to advantages with regard to cost, robustness and/or data transfer lengths. For example, the components of the bus system, field devices and central control unit that are necessary for data transfer via the bus system can manage with simple and therefore cost-effective and/or robust hardware.

In order to carry out the described failure detection method, in particular all the field devices of the elevator system are logically linked in an unbranched chain configuration and are checked as described. However, it is also possible that individual field devices are not included in the described failure detection method and must be subjected to a separate test, for example.

According to one embodiment, the field devices of the passenger transport system have serially numbered identification numbers (IDs) along the chain configuration. In the context of the failure detection method, a field device then forwards a received test telegram to the next field device in the chain configuration by incrementing the address ID.

In other words, it may be advantageous to consecutively number the field devices of a passenger transport system with regard to the IDs thereof, so that the ID of a field device correlates with the position of this field device within the logical chain configuration received during the failure detection method. The further behind a field device is in the chain configuration, for example, the higher its ID is.

Each test telegram is therefore characterized by an address ID, which corresponds to an above-described object identifier, and each field device reacts to the test telegram which has an address ID corresponding to the ID of the field device. In this specific case, the address ID of a test telegram therefore directly identifies its receiver.

For example, the IDs of the field devices may be simply consecutively numbered in integers (ID=1, 2, 3, 4, . . . , n; n=number of field devices). At the start of a monitoring cycle, the control unit sends the test telegram to the field device having the ID=1. This field device increments the address ID, i.e. increases the address ID in this example to the value "1" and sends the test telegram from itself on to the device having the new address ID, i.e. to the field device having the ID=2. There, the address ID is incremented again and the test telegram is forwarded to the field device having the ID=3 again, etc. When the test telegram has reached the last field device in the chain configuration, i.e. the last field device having the ID=n, forwarding the test telegram can be interrupted.

The rule for creating the new address ID, specifically incrementing by the value "1", can be implemented very easily and is in particular identical for all field devices. The outlay of programming or configuring the individual field devices is therefore very low.

Alternatively, the address ID can be incremented in this last field device, too, and the field device can attempt to forward the test telegram to a subsequent field device that does not exist in this case. As the control unit monitoring the communication between the field devices knows that the relevant field device is the last in the chain configuration, it will not detect the malfunction of the corresponding forwarding of the test telegram as a supposed failure in this case.

It is noted that serial numbering is not necessarily understood to mean that the IDs of adjacent field devices have to differ by the value "+1". In principle, other incremental steps are also conceivable. For example, the field devices may be consecutively numbered only evenly or only oddly, i.e. by incremental steps of "+2". In this case, the address ID should be incremented in each case by a value that corresponds to the quantitative difference between two adjacent IDs. Incrementing in negative incremental steps of e.g. "−1", "−2" or the like, i.e. decrementing, is also possible.

According to one embodiment, a plurality of the field devices or even all the field devices in the passenger transport system are identical with regard to their hardware.

In other words, field devices used in the passenger transport system may preferably be technically identical. In this case, the field devices may differ with regard to the software used therein or data stored therein, in order to individualize the field devices, for example, or to adapt said devices to local purposes or usage conditions. In particular, the identification numbers for each field device should be individually assigned and therefore uniquely allocated.

For example, in a passenger transport system implemented as an elevator system, a plurality of floor door switches as field devices can be used to monitor a current closure state of an allocated floor door in each case. All these field devices may be identical with regard to the hardware used. In this specific case, each field device may comprise a door switch, which detects the closure state of the associated door, and a controller or an interface which is designed to transmit the closure state, detected by the door switch, in the form of a suitable signal to the bus system and to get said bus system to forward the state to the central control unit.

Specifically with regard to the failure detection method proposed herein, each field device may be designed to obtain a test telegram via a data input and, in response to receiving said telegram, to forward the test telegram to the next field device in the chain configuration. In order to be able to easily implement forwarding in this manner, each field device may be designed, as explained in the preceding paragraph, to increment only the address ID specified in the test telegram, as a result of which the test telegram is automatically addressed to the following field device in the chain configuration. The last field device in the chain configuration may also be designed such that an attempt of the last field device to forward the test telegram to a subsequent field device must naturally fail; however, this is acceptable in the context of the failure detection method, as the control unit can predict in advance that forwarding the test telegram will fail in the case of this last field device.

As a plurality of or even all the field devices within the passenger transport system can have the same hardware, manufacture and/or installation of field devices of this kind can be standardized, thereby saving costs. Logistics in the production, storage and installation of the field devices can also be simplified.

According to one embodiment, the field devices are further designed to, in the context of the failure detection method, modify a received test telegram in a determined manner before forwarding. The control unit monitors the successful implementation of this modification in the context of the failure detection method.

In other words, it may be advantageous, during the failure detection method, to forward the test telegram in an unchanged manner not only from field device to field device along the chain configuration, but to modify the test telegram in a previously determined manner before each forwarding.

Preferably, it may be provided in this case that each field device modifies a test telegram received thereby in an identical manner. In a specific embodiment, the modification of the received test telegram comprises calculating a changed test digit as part of the test telegram. For example, the field device may increment the test telegram in a predetermined manner using a simple counter. Alternatively, the received test telegram may be modified by calculating a CRC (Cyclic Redundancy Check) value. As another alternative, the test telegram can be modified by taking into account a predetermined value, for example the ID of the relevant field device. When the test telegram is modified, it is only significant that this modification is carried out in a deterministic manner, i.e. can be anticipated, and therefore successful modification can also be checked, for example by the control unit.

As each field device deterministically modifies the test telegram before the test telegram is forwarded and this can be monitored by the control unit, not only can the control unit, in the context of the failure detection method, determine whether the relevant field device still functions at all or can communicate via the bus system, but at least one minimal functionality of each field device can be established.

Providing a deterministic modification option in a field device for the test telegram to be forwarded generally requires at most a low additional cost for the field device and can frequently be implemented using simple hardware or simple software.

According to one embodiment, at least one of the field devices comprises a plurality of data transfer units. In the context of the failure detection method, in this case the test telegram is sent only to the data processing unit that, if there is a change in state of this field device, outputs a spontaneous report indicating this change in state.

In other words, field devices can be provided in the passenger transport system which comprise a plurality of various data processing units, for example in the form of separate processors, computers or the like. These data processing units may differ with regard to the data processes to be carried out thereby, for example. At least one of these data processing units is regularly configured to detect a change in state of the relevant field device. A change in state is understood in this context to mean a change in a variable monitored by the field device, such as a closure state of a floor door. The relevant data processing unit is designed in this case to output a spontaneous report to the central control unit when a change in state of this kind is detected, in order to communicate the change in state to said control unit.

In the context of the failure detection method, it may be sufficient in general to transmit the test telegram only to the data processing unit provided for outputting the spontaneous report, as it is sufficient in general to detect failures of this data processing unit.

EP 2 741 993 B1 describes a test method of an elevator system and a monitoring apparatus for carrying out the test method, in which a field device referred to as a bus node comprises two data processing units in the form of separate microprocessors.

According to one embodiment, the central control unit is configured to, in the context of the failure detection method, initiate one of a plurality of possible failure reactions if it is detected that a field device does not forward the test telegram, depending on a functionality to be carried out by the relevant field device, the possible failure reactions comprising, for example, an abrupt emergency stop of the passenger transport system, a soft stop of the passenger transport system, limiting functions of the passenger transport system, outputting an alarm signal to users of the passenger transport system, and outputting a failure signal to operators of the passenger transport system. In this case, it does not have to be possible to initiate all the above-mentioned failure reactions; other failure reactions are also conceivable.

In other words, it may be provided that, in response to it being detected during the failure detection method that at least one of the field devices has not forwarded a test telegram supplied thereto and therefore a failure of this field device is to be assumed, the central control unit initiates a suitable response thereto. In this case, it can be taken into account that the various field devices provided in the passenger transport system can be used for different purposes and correspondingly can have different functionalities. The kind of reaction to a failure of a field device may depend in this case on the functionality implemented for this field device. The central control unit should take this into account when initiating the failure reaction and correspondingly initiate a reaction that is suitable for the failure of this specific field device.

For example, it may appear necessary, in the case of field devices that play a very significant role in the safety of the passenger transport system or that monitor functions that are essential for the safety of the passenger transport system, for the central control unit to initiate an abrupt emergency stop of the passenger transport system in response to a failure of a field device of this kind. In the case of an emergency stop of this kind, the power of a brake and a drive, for example, of the passenger transport system can be switched on, so that the passenger transport system therefore arrives at a standstill as quickly as possible.

When failures of other field devices having other functionalities are detected, less drastic reactions may be sufficient, such as controlled braking and stopping the passenger transport system in the context of a soft stop or merely limiting functions of the passenger transport system (for example, prohibiting an elevator system from traveling to a specific floor inside a building). In other cases, in response to detecting a failure, it may be sufficient merely to output a signal, for example optically and/or acoustically, to users of the passenger transport system, so that these users are informed, for example, about possible dangers or precautions to be taken when using the passenger transport system. Alternatively or additionally, a failure signal can also be output to the operator of the passenger transport system, so that said operator can initiate repair measures, for example.

It is also possible that after one of the above-described failure reactions has been initiated, the method for detecting failures of the field devices is resumed. In addition, the central control unit can send a corresponding test telegram to the field device that is arranged logically behind the faulty field device. The interrupted test is therefore restarted and resumed.

According to one embodiment, the passenger transport system comprises at least 20, preferably at least 50, field devices in the logically linked chain configuration.

In other words, in the failure detection method, a relatively large number of field devices should be contained in the unbranched chain configuration that is received in a logically linked manner, so that the test telegram can be sent through the entire chain configuration during the monitoring cycle and therefore a single initiating transmission of the test telegram to the first field device in the chain configuration for the first time can ultimately monitor the occurrence of failures in a plurality of field devices.

In particular in the case of such a large number of field devices in a passenger transport system, the property of the failure detection method proposed herein may have a positive effect, according to which a number of data transfers for monitoring the plurality of field devices is substantially smaller than was the case in failure detection methods that were conventionally carried out. Correspondingly, even if there is a large number of field devices in the passenger transport system, a monitoring cycle can be carried out sufficiently quickly to be able to satisfy strict regulations with regard to a failure discovery period.

According to one embodiment, the bus system, the central control unit and the field devices are designed for a maximum data transfer rate of at most 19200 baud (i.e. bits per second), preferably at most 9600 baud.

Due to the highly efficient failure detection method presented herein, malfunctions in field devices of the passenger transport system can be detected sufficiently quickly even at relatively low data transfer rates of this kind. The above-mentioned components of the passenger transport system that are designed merely for such a low data transfer rate can be provided in a cost-effective manner and may be superior to components that are designed for higher data transfer rates with regard to their robustness and/or with regard to a reliable data transfer length.

According to a second aspect of the present invention, a method for detecting failures in field devices in a passenger transport system is proposed. In this case, the passenger transport system comprises a central control unit, a plurality of field devices, and a bus system, each of which can be designed as described above with regard to the first aspect of the invention. During the method, the field devices are received in turn in a logically linked manner as in an unbranched chain configuration. The method comprises at least the following steps: At the start of a monitoring cycle, a test telegram is transmitted by the central control unit to a first field device in the chain configuration via the bus system. During the monitoring cycle, in response to the relevant field device receiving a test telegram, each field device then forwards the test telegram to a next field device in the chain configuration via the bus system. This process is repeated until the test telegram has reached a final field device in the chain configuration. In this case, during the monitoring cycle, a communication between the field devices occurring via the bus system is monitored in order to detect when a field device does not forward the test telegram in response to receiving the test telegram. If non-occurring forwarding of the test telegram is detected during monitoring of this kind, this can be regarded as an indication of a failure in the relevant field device and a suitable reaction in the passenger transport system can be initiated thereupon.

In other words, the method for detecting failures inside the passenger transport system may be specifically designed to carry out the failure detection method as has been described above with regard to embodiments according to the first aspect of the present invention. Conversely, a passenger transport system according to the first aspect of the present invention may also be regarded as designed to be able to carry out an embodiment of the method according to the second aspect of the present invention.

According to a third aspect of the present invention, a computer program product is proposed that comprises computer-readable instructions which, when executed, instruct a computer to carry out a method according to an embodiment of the previously mentioned second aspect of the invention or to control said method accordingly.

In this case, the computer may be part of a programmable control unit of the passenger transport system, for example. Alternatively or additionally, the computer or parts of the computer may also be integrated in respective field devices of a passenger transport system. In this case, the term "computer" is to be interpreted broadly and encompasses processors, CPUs or the like, for example. In addition, storage media may be provided, in order to be able to supply data to the computer or to be able to store data for said computer. The computer program product can be formulated in any desired computer-readable language.

According to a fourth aspect of the present invention, a computer-readable medium is described which comprises a computer program product, stored thereon, according to an embodiment of the above-mentioned third aspect of the invention.

In other words, the computer-readable medium may be any desired medium, in which computer-readable instructions can be stored temporarily or permanently and can be read out by a computer. In this case, the computer-readable instructions may be stored in various physical ways, for example in magnetic form, optical form, electrical form, etc. For example, the computer-readable medium may be a CD, a DVD, a flash memory, a ROM (read-only memory), a PROM (programmable ROM), an EPROM (erasable PROM), etc. The computer-readable medium may also be part of a larger data-storing unit such as a server or even the Internet, from which the computer program product stored therein can be downloaded.

It should be noted that some of the possible features and advantages of the invention are described herein with reference to different embodiments, in particular in part with reference to a passenger transport system and in part with reference to a failure detection method to be carried out therein. A person skilled in the art recognizes that the features can be combined, adapted or replaced as appropriate in order to arrive at further embodiments of the invention.

Embodiments of the invention will be described below with reference to the accompanying drawings, neither the drawings nor the description being intended to be interpreted as limiting the invention.

DESCRIPTION OF THE DRAWINGS

FIG. 2 shows steps of a failure detection method for a passenger transport system according to an embodiment of the present invention.

Figure 1:
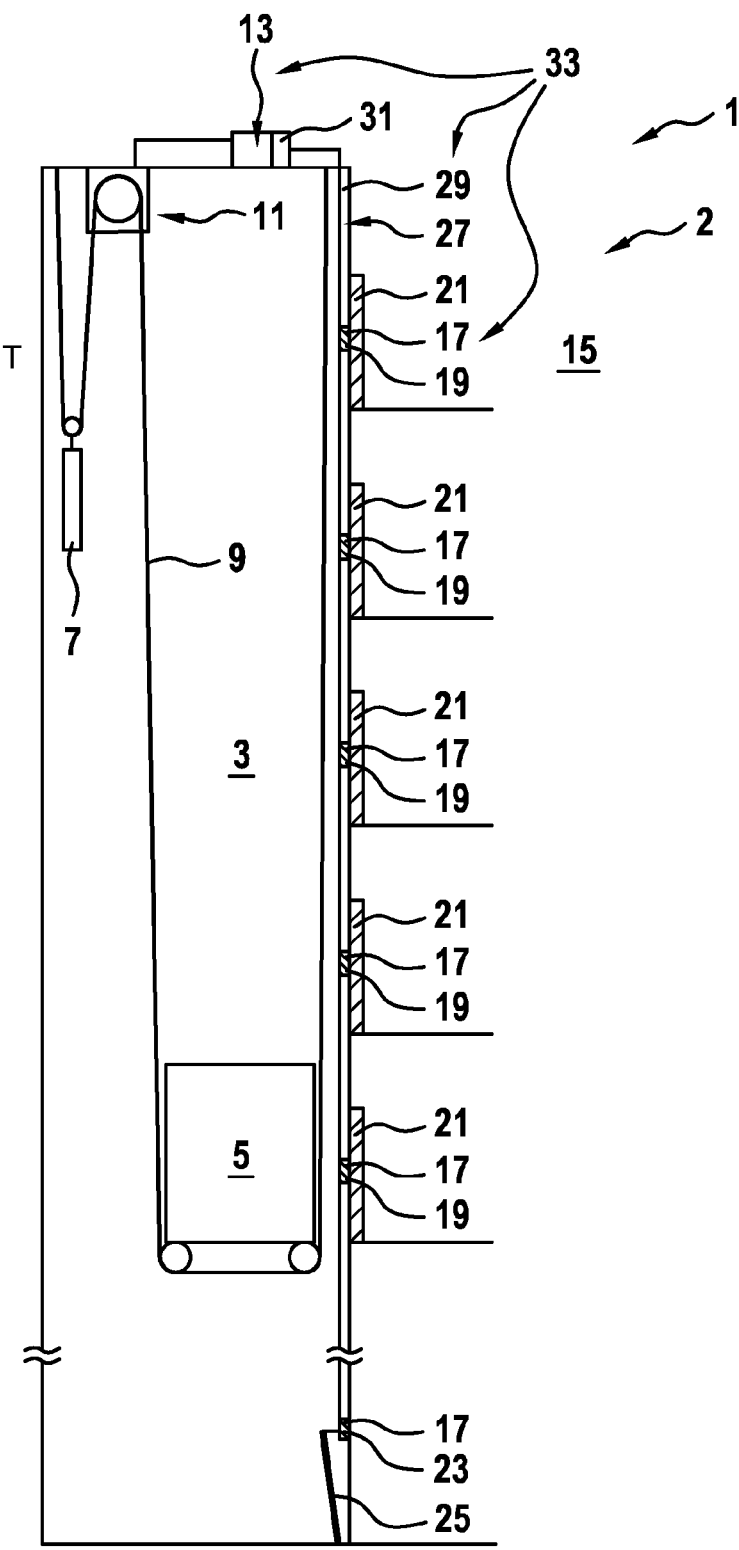
FIG. 1 shows a passenger transport system in the form of an elevator system according to an embodiment of the present invention.

The drawings are merely schematic and not to scale. Like reference signs refer in different drawings to like or analogous features.

DETAILED DESCRIPTION

FIG. 1 shows a passenger transport system 1 according to the invention in the form of an elevator system 2. The elevator system 2 comprises an elevator shaft 3, in which an elevator car 5 and a counterweight 7 can be moved. For this purpose, the elevator car 5 and the counterweight 7 are suspended on a cable-like or belt-like suspension means 9, which can be moved by a drive motor 11. A function of the elevator system 2 and in particular operation of the drive motor 11, as well as optionally other components of the elevator system 2, can be controlled by means of a central control unit 13.

In order to be able to ensure correct functioning and in particular safety of the elevator system 2, a plurality of field devices 17 are accommodated in a structure 15 that accommodates the elevator system 2. In this case, the field devices 17 are distributed over the structure 15.

The field devices 17 may be door switches 19, for example, which can monitor a closure state of doors 21, in particular of floor doors, of the elevator system 2. In this case, a door switch 19 functions like a type of sensor that can detect the current closure state of the door 21 associated therewith and, as soon as the closure state changes, can signal this as a data telegram in the form of a spontaneous report, for example.

Furthermore, a ladder 25 may be mounted close to a floor or a pit of the elevator shaft 3, for example, the correct, neat positioning of which ladder on a side wall of the elevator shaft 3 can be monitored, for example, by means of another switch 23 functioning as a field device 17.

The field devices 17 may be part of a safety circuit 27 of the elevator system 2 and may be connected to the central control unit 13 or in particular to a safety monitoring unit 31 (SSU—Safety Supervising Unit) integrated there, for example, by means of series cabling 29 for example. The cabling 29 and controllers provided in the field devices 17 and/or the central control unit 13 can form a bus system 33 together in this case, via which bus system data telegrams can be exchanged between the participants of a data communication.

Each of the field devices 17 is set up to output sensor signals generated by a sensor and/or to receive control signals to be implemented by an actuator. In this case, a field device 17 may, for example, itself comprise a senor and/or an actuator and output the sensor signals generated by the sensor to other devices, in particular to the central control unit 13, via external terminals, or may convey control signals received from other devices, in particular the central control unit 13, to the actuator via external terminals of this kind, in order that said actuator can implement the control commands contained therein. Alternatively, a field device 17 may function merely as a node that can, for example, receive sensor signals from an external sensor or from another field device 17 and then output said signals to further devices, or that can receive control signals from further devices and then pass said signals on to an external actuator, in order that said actuator can implement the control signals.

The passenger transport system 1 is specifically configured to carry out a failure detection method. For this purpose, the central control unit 13 and/or the field devices 17 can be configured, by means of suitable hardware-based and/or software-based measures, such that the method steps described in the following are carried out in the context of carrying out the failure detection method during a monitoring cycle, or the properties of the central control unit 13 and/or of the field devices 17 are correspondingly configured to carry out method steps of this kind. Possible details of embodiments of the failure detection method are explained in the following with reference to FIG. 2.

FIG. 2 is a symbolic illustration of both an actual, hardware connection between the central control unit 13 and a plurality of field devices 17(a), 17(b), 17(c), 17(d), 17(e) via the bus system 33 and a logical linking in an unbranched chain configuration of the field devices 17(a), 17(b), 17(c), 17(d), 17(e) to be assumed during the failure detection method. It should be noted that the drawing shows only five field devices 17(a), 17(b), 17(c), 17(d), 17(e) by way of example, whereas in practical applications, a substantially larger number of field devices, for example more than 20, more than 50 or even more than 100, are usually provided in a passenger transport system 1, such as a "high-rise" elevator system 2.

In the case of the hardware connection, the central control unit 13 or the safety monitoring unit 31 integrated therein is connected to each field device 17(a), 17(b), 17(c), 17(d), 17(e) via a common data line 37 and a plurality of individual stub lines 35(a), 35(b), 35(c), 35(d), 35(e) such that data can be exchanged between the central control unit 13 and each field device 17(a), 17(b), 17(c), 17(d), 17(e) and between the different field devices 17(a), 17(b), 17(c), 17(d), 17(e). The common data line 37 can be implemented by the wiring 29, for example, which extends through the elevator shaft 3 in FIG. 1. The stub lines 35(a), 35(b), 35(c), 35(d), 35(e) can, for example, locally connect each door switch 19 acting as a field device 17(a), 17(b), 17(c), 17(d), 17(e) to the common data line 37. The central control unit 13 and each field device 17(a), 17(b), 17(c), 17(d), 17(e) may be provided with a suitable interface or a suitable controller, in order to be able to output data via the data line 37 and the stub lines 35(a), 35(b), 35(c), 35(d), 35(e) or to receive data from said data line and stub lines. In principle, a bus system 33 implemented in this way can exchange data arbitrarily between the central control unit 13 and the field devices 17(a), 17(b), 17(c), 17(d), 17(e) and between the field devices 17(a), 17(b), 17(c), 17(d), 17(e) themselves, i.e. each device connected to the bus system 33 can, in principle, communicate with each other device, in that it transmits data having a corresponding object identifier, in this case a corresponding address ID.

During the failure detection method proposed herein, however, data or test telegrams containing data of this kind can be transferred from the central control unit 13 to the field devices 17(a), 17(b), 17(c), 17(d), 17(e) or between the field devices 17(a), 17(b), 17(c), 17(d), 17(e) only in such a way as though the field devices 17(a), 17(b), 17(c), 17(d), 17(e) were linked in a kind of "daisy chain" in an unbranched chain configuration. In this case, each field device usually (i.e. with the exception of the first and last field devices in the chain configuration) has precisely one preceding field device from which it receives data and precisely one subsequent field device to which it forwards data.

In other words, the central control unit 13 should transmit a test telegram to the first field device 17(a) at the start of a monitoring cycle of the failure detection method. In general, this can occur by the central control unit 13 providing the test telegram with an object identifier in the form of an address ID which corresponds to the identification number of the first field device 17(a) and communicates the test telegram via the bus system 33.

After the first field device 17(a) has obtained the test telegram in the manner symbolized by the arrow 39(a), the first field device 17(a) forwards said test telegram in an automated manner to the second field device 17(b) in the received chain configuration, as indicated by the arrow 39(b). This field device 17(b), in turn, modifies the address ID of the test telegram and then forwards this telegram to the subsequent field device 17(c), as indicated by the arrow 39(c). Analogously, the test telegram should be serially forwarded through the entire chain configuration from field device 17(x) to field device 17(x+1) until said telegram finally reaches a last field device 17(e), indicated by arrows 39(d) and 39(e).

This last field device 17(e) may "know" that there is no subsequent field device and can end forwarding of the test telegram on its own initiative. Alternatively, all the field devices 17(a), 17(b), 17(c), 17(d), 17(e) may be substantially identically designed or configured and the last field device 17(e) can, in a similar way to the preceding field devices 17(a), 17(b), 17(c), 17(d), send the test telegram having a changed address ID, as shown by arrow 39(f).

During the entire forwarding process of the test telegram from field device 17(x) to field device 17(x+1), the central control unit 13 or the SSU 31 monitors the data communication between the field devices 17(a), 17(b), 17(c), 17(d), 17(e) occurring via the bus system 33. If all the field devices 17(a), 17(b), 17(c), 17(d), 17(e) and the bus system 33 and in particular the stub lines 35(a), 35(b), 35(c), 35(d), 35(e) thereof function correctly, the central control unit 13 will detect that the test telegram is forwarded successively from the first field device 17(a) as far as the last field device 17(e) and can therefore assume that data communication inside the passenger transport system 1 and the field devices 17(a), 17(b), 17(c), 17(d), 17(e) thereof functions correctly.

However, if the forwarding of the test telegram is interrupted, this is detected by the central control unit 13 and regarded as an indication of a failure. For example, the stub line 35(c) to the third field device 17(c) may, as indicated by the cross "x" in FIG. 2, be interrupted, so that the test telegram coming from the preceding second field device 17(b) cannot be transmitted to the third field device 17(c) along the arrow 39(c) and correspondingly the test telegram is not then forwarded from the third field device 17(c) to the subsequent fourth field device 17(d). When monitoring the communication occurring via the bus system 33, the central control unit 13 detects that the third field device 17(c) has not forwarded the test telegram and can therefore assume there is a failure in this third field device 17(c).

In response thereto, a failure reaction may be initiated, which reaction may vary depending on the importance of the faulty field device 17(c) for the safety of the passenger transport system 1, and may range from an abrupt emergency stop via a soft stop or limiting functions of the passenger transport system 1 to merely outputting alarm signals or information to users and/or operators of the passenger transport system 1.

After the failure reactions have been initiated, the central control unit 13 can send a test telegram to the fourth field device 17(d), which is constructed exactly as if it came from the third field device 17(c). The interrupted test is therefore restarted and resumed.

In order to optionally also be able to determine at least minimal functionalities of the field devices 17(a), 17(b), 17(c), 17(d), 17(e) in the context of the failure detection method, it may be provided that each field device 17(a), 17(b), 17(c), 17(d), 17(e) forwards the test telegram to the relevant following field device in each case not only without changing said telegram, but modifies the test telegram or a test digit contained therein in a predetermined manner, before the test telegram is forwarded. By monitoring successful modification of the test telegram during each forwarding process, the central control unit 13 can therefore also monitor the minimal functionality of each field device 17(a), 17(b), 17(c), 17(d), 17(e).

If one or more or even all the field devices 17(a), 17(b), 17(c), 17(d), 17(e) comprise not only one individual data processing unit, but a plurality of data connection units 18', 18" accommodated therein, for example as is proposed in EP 2 741 993 B1 and shown symbolically for the field device 17(*d*), it may usually be sufficient to send the test telegram, in the context of the failure detection method, only to the data processing unit 18' of a field device 17(*d*) which, when there is a change in state of the field device 17(*d*), sends a spontaneous report to the central control unit 13 indicating said change in state.

A data volume to be transmitted via the bus system 33 during the failure detection method can be significantly reduced in comparison to conventional failure tests on the basis of the proposed serial forwarding of the test telegrams, such that, for example, failures can be recognized more quickly. In particular, a presence test for all the field devices 17(*a*), 17(*b*), 17(*c*), 17(*d*), 17(*e*) can be significantly shortened using the failure detection method described herein in a passenger transport system 1, in particular to less than 1 s for 60 field devices. For this purpose, the use of inexpensive hardware may be sufficient and a data transfer rate on the bus system 33 does not need to be increased significantly. This can lead to advantages with regard to cost, robustness and transfer length.

For comparison purposes only, it is described conclusively how a presence test of field devices has conventionally been carried out in passenger transport systems. As indicated in FIG. 2 by the dashed lines 41(*a*), 41(*b*), 41(*c*), 41(*d*), 41(*e*), an individual request telegram was sent from the central control unit 13 to each individual field device 17(*a*), 17(*b*), 17(*c*), 17(*d*), 17(*e*) and then a response telegram was transmitted from the field device triggered in such a way back to the central control unit 13. A data volume communicated via the bus system 33 in this case was approximately twice as large as the data volume resulting from the new failure detection method described herein.

Finally, it should be noted that terms such as "comprising" and the like do not preclude other elements or steps, and terms such as "a" or "one" do not preclude a plurality. Furthermore, it should be noted that features that have been described with reference to one of the embodiments above can also be used in combination with other features of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 passenger transport system
2 elevator system
3 elevator shaft
5 elevator car
7 counterweight
9 suspension means
11 drive motor
13 central control unit
15 structure
17 field devices
18 data processing units
19 door switch
21 (floor) door
23 switch
25 ladder
27 safety circuit
29 cabling
31 safety monitoring unit (SSU)
33 bus system
35 stub lines
37 common data line
39 arrow indicating data transfer
41 arrow indicating data transfer

The invention claimed is:

1. A passenger transport system comprising:
a central control unit for controlling functions of the passenger transport system;
a plurality of field devices arranged in the passenger transport system in a spatially distributed manner;
a bus system connecting the central control unit and the field devices for transferring data between the central control unit and the field devices;
wherein each of the field devices is configured to output the data to at least one of the central control unit and another of the field devices via the bus system;
wherein the central control unit is configured to output the data to at least one of the field devices via the bus system; and
wherein the passenger transport system is configured to carry out a failure detection method, in which,
the field devices are logically linked in an unbranched chain configuration,
the control unit transmits a test telegram to a first of the field devices in the chain configuration via the bus system at a start of a monitoring cycle,
during the monitoring cycle, in response to receiving the test telegram, each of the field devices forwards the test telegram to a next one of the field devices in the chain configuration via the bus system until the test telegram reaches a final one of the field devices in the chain configuration,
during the monitoring cycle, the control unit monitors communications between the field devices occurring via the bus system to detect when a one of the field devices does not forward the test telegram.

2. The passenger transport system according to claim 1 wherein the field devices along the chain configuration have consecutively numbered address IDs assigned thereto and wherein during the monitoring cycle of the failure detection method, each of the field devices forwards the received test telegram to the next one of the field devices in the chain configuration by incrementing the address ID.

3. The passenger transport system according to claim 1 wherein the field devices are identical with regard to hardware contained therein.

4. The passenger transport system according to claim 1 wherein each of the field devices modifies the test telegram in a predetermined manner before forwarding the test telegram and the control unit monitors the test telegram for successful implementation of the modification as part of the failure detection method.

5. The passenger transport system according to claim 4 wherein the modification comprises calculating a changed test digit as part of the test telegram.

6. The passenger transport system according to claim 1 wherein at least one of the field devices includes a plurality of data processing units and wherein the test telegram is sent only to one of the data processing units that, if there is a change in state of the at least one field device, outputs a report indicating the change in state.

7. The passenger transport system according to claim 1 wherein the central control unit initiates one of a plurality of possible failure reactions if the central control unit detects that one of the field devices does not forward the test telegram and, depending on a functionality to be carried out by the one field device, the possible failure reactions include: an abrupt emergency stop of the passenger transport system; a soft stop of the passenger transport system; limiting functions of the passenger transport system; outputting an alarm signal to users of the passenger transport system; and outputting a failure signal to operators of the passenger transport system.

8. The passenger transport system according to claim 1 wherein at least one of each of the field devices is configured to output sensor data generated by a sensor to the central control unit via the bus system and the central control unit is configured to output control data to be implemented by an actuator to at least one of the field devices via the bus system.

9. The passenger transport system according to claim 1 including at least twenty of the field devices in the logically linked chain configuration.

10. The passenger transport system according to claim 1 wherein the bus system, the central control unit and the field devices transfer the data at a data transfer rate in a range of 9600 baud to 19200 baud.

11. A method for detecting failures in field devices in a passenger transport system, the method comprising the steps of:
   operating a central control unit to control functions of the passenger transport system, wherein a plurality of field devices are arranged in the passenger transport system in a spatially distributed manner and are logically linked in an unbranched chain configuration, and a bus system transfers data between the central control unit and the field devices, wherein each of the field devices outputs the data to at least one of the central control unit and another one of the field devices via the bus system, and the central control unit outputs the data to at least one of the field devices via the bus system;
   at a start of a monitoring cycle transmitting a test telegram from the central control unit to a first one of the field devices in the chain configuration via the bus system;
   during the monitoring cycle, each of the field devices that receives the test telegram forwards the test telegram to a next one of the field devices in the chain configuration via the bus system until the test telegram reaches a final one of the field devices; and
   during the monitoring cycle, monitoring with the central control unit communication between the field devices occurring via the bus system to detect when a one of the field devices does not forward the test telegram in response to receiving the test telegram.

12. The method according to claim 11 including assigning to the field devices along the chain configuration consecutively numbered IDs and when each of the field devices forwards the received test telegram to a next one of the field devices in the chain configuration incrementing the address ID.

13. The method according to claim 11 including each of the field devices modifying the received test telegram in a predetermined manner before forwarding the test telegram and wherein the central control unit monitors the test telegram for successful implementation of the modification.

14. A computer program product comprising a non-transitory computer-readable medium having stored thereon instructions that can be read by a computer and that, when executed by the computer, instruct the computer to carry out the method according to claim 11.

* * * * *